(12) United States Patent
Lahav et al.

(10) Patent No.: US 7,573,871 B2
(45) Date of Patent: Aug. 11, 2009

(54) APPARATUS FOR PROCESSING OTN FRAMES UTILIZING AN EFFICIENT FORWARD ERROR CORRECTION

(75) Inventors: Danny Lahav, Kfar Saba (IL); Haim Moshe, Petach Tikva (IL); Amir Dabby, Sitriya (IL); Liviu Altarovici, Tel Aviv (IL)

(73) Assignee: TranSwitch Israel, Ltd., Herzliya (IL)

( * ) Notice: Subject to any disclaimer, the term of this patent is extended or adjusted under 35 U.S.C. 154(b) by 649 days.

(21) Appl. No.: 10/499,435

(22) PCT Filed: Dec. 10, 2002

(86) PCT No.: PCT/US02/39338

§ 371 (c)(1),
(2), (4) Date: Jun. 21, 2004

(87) PCT Pub. No.: WO03/063516

PCT Pub. Date: Jul. 31, 2003

(65) Prior Publication Data

US 2005/0068995 A1 Mar. 31, 2005

(51) Int. Cl.
*H04L 12/28* (2006.01)
(52) U.S. Cl. ..................................... 370/389
(58) Field of Classification Search .......... 370/351–430
See application file for complete search history.

(56) References Cited

U.S. PATENT DOCUMENTS

| | | | |
|---|---|---|---|
| 4,162,480 A | 7/1979 | Berlekamp | |
| 4,410,989 A | 10/1983 | Berlekamp | |
| 4,642,632 A * | 2/1987 | Ohyagi et al. | 340/7.43 |
| 5,642,365 A | 6/1997 | Murakami et al. | |
| 5,699,369 A | 12/1997 | Guha | |
| 5,974,582 A | 10/1999 | Ly | |
| 6,011,510 A * | 1/2000 | Yee et al. | 342/357.09 |
| 6,185,715 B1 | 2/2001 | Fang et al. | |
| 6,263,471 B1 | 7/2001 | Huang | |
| 7,002,968 B1 * | 2/2006 | Tomizawa et al. | 370/395.52 |

OTHER PUBLICATIONS

P. Micheal Henderson, Forward Error Correction in Optical Networks, Jul. 20, 2001, Business & Technology Planning for the Network Access Division, Conexant Systems, Inc., p. 124-138.*
Multilink Technology Corporation, MTC6131 Product Overview, Oct. 5, 2001, p. 1-4.*
ITU-T G.709 "Network Node Interface for optical transport network (OTN)" Oct. 2001.

* cited by examiner

*Primary Examiner*—Kwang B Yao
*Assistant Examiner*—Tung Q Tran
(74) *Attorney, Agent, or Firm*—Myers Wolin, LLC

(57) ABSTRACT

An apparatus and method utilizing an efficient forward error correction (FEC), targeted for processing optical transport network (OTN) signals having transmission rates in excess of 10 Gbps. The FEC uses an advanced implementation of the Bose Chaudhuri Hocquenghem (BCH) code. The use of the BCH code for the FEC improves the performance over prior art solutions for both error correction and detection.

8 Claims, 5 Drawing Sheets

APPARATUS FOR PROCESSING OTN FRAMES UTILIZING AN EFFICIENT FORWARD ERROR CORRECTION

REFERENCES CITED

| U.S. Pat. No. | | |
|---|---|---|
| 5,974,582 | October 1999 | Ly |
| 5,642,365 | June 1997 | Murakami et al. |
| 5,699,369 | December 1997 | Guha |
| 6,185,715 | February 2001 | Fang, et al. |
| 6,263,471 | July 2001 | Huang |
| 4,410,989 | October 1983 | Berlekamp |
| 4,162,480 | July 1979 | Berlekamp |

OTHER REFERENCES

ITU-T G.709 "Network Node Interface for optical transport network (OTN)" standard

FIELD AND BACKGROUND OF THE INVENTION

The present invention relates generally to optical transport networks and particularly to improving the performance of forward error correction (FEC) in such networks.

As increasing demands are made on the world's communications networks, new standards emerge to cater for the challenges. The optical transport network (OTN) was developed in order to provide the transmission needs of today's wide range of digital services requiring significant transmission bandwidth and speed. OTN was conceived in 2001 to overcome the drawbacks of current optical networks such as the synchronous optical network (SONET) or the synchronous digital hierarchy (SDH). The OTN capabilities and facilities were published as a standard, known as ITU—G.709 "Network node interface for the optical transport network (OTN)" (hereinafter "G.709 standard"). The G.709 standard is based on the definitions for SONET and SDH with some additional key elements targeted towards improving the performance and reducing the cost. These include management of optical channels in the optical domain, forward error correction (FEC) to improve error performance and enable longer optical spans, and a standardized method for managing optical wavelengths (channels) end-to-end without the need for processing of the payload signal.

Reference is now made to FIG. 1, which shows an illustration of an OTN frame structure 100. An OTN frame consists of three distinct parts: an overhead area 110, a payload area 120, and a forward error correction (FEC) area 130. Overhead area 110 includes data for operation, maintenance functions, and administration. Payload area 120 includes consumer data to be transported. FEC area 130 is used to improve the error avoidance performance (both detection and correction), which further enables the placement of longer optical spans.

FEC has been used in telecommunications for many years, mainly in the areas of satellite communications and undersea data transport. FEC has been important in enabling communications to maintain acceptable performance quality in noisy environments, while keeping infrastructure costs within reason. As transmission bit rates increase to 10 Giga bits per second (Gbps) and above, the physical parameters of the optical fiber network play a more significant role in the degradation of transmitted pulses of light. FEC provides additional coded data to enable error checking and correction by a receiving device. The G.709 standard includes a standard FEC that enables long haul transmission at higher line rates without degraded performance.

The FEC method used in the OTN is a Reed-Solomon RS (255,239) code. This means that for every 239 bytes of data, another 16 bytes of data are added for the purpose of error correction. Using the Reed-Solomon scheme for FEC, eight error symbols can be corrected, and sixteen error symbols can be detected.

Reference is now made to FIG. 2, which shows a schematic diagram illustrating the method for creating FEC data by processing overhead area 110 and payload area 120. In order to create FEC area 130, i.e., the RS (255,239) code, each row of overhead area 110 and payload area 120 is divided into 239 groups 210-1 through 210-239. Each group 210 includes sixteen consecutive bytes belonging to overhead area 110 and payload area 120. As can be seen in FIG. 2, group 210-1 includes the first sixteen bytes, i.e., bytes "1" through "16" of OTN frame 100, group 210-2 includes the next sixteen bytes, i.e., bytes "17" through "32" of OTN frame 100, and so on. For each row, additional sixteen groups 220-1 through 220-16 of sixteen bytes each are added to the groups 210. Then groups 210 and 220 are passed through a Reed-Solomon encoder, which produces the FEC code words. The process is repeated for the other three rows, thus handling the entire OTN frame. In an OTN frame, each row contains 16 FEC code-words of 16 bytes for the row, resulting in 64 FEC code-words (4×16) for every OTN frame.

A Bose-Chaudhuri-Hocquenghem (BCH) code is an example of a code that can be used for correcting errors in input data. The BCH code is used in satellite communication links, where error correction can be employed to mitigate the effects of noise interference. The BCH code has been widely used in practice due to its high flexibility in choosing code length and number of correctable errors, as well as its error detecting capabilities, which are achieved using relatively few check bits. The BCH code, however, requires complex decoding algorithms to reconstruct the information from a received signal. The complex decoding algorithms have typically been implemented by special-purpose computers, which perform computations in real time.

As the need for very high-speed encoders and decoders has developed, the limitation of the computation technology has become apparent. Even with the most sophisticated high-speed digital logic circuits, the highest achievable data rate appears to be about 1 Gbps.

A conventional BCH decoder corrects the errors by applying the following four steps: (1) calculating the syndromes; (2) calculating the error location polynomial; (3) calculating the error location numbers; and (4) correcting the errors. The syndromes are the values that contain the information needed to identify and locate any errors. The syndromes are usually computed by dividing the received data with a generator polynomial. The conventional technique for translating the syndrome patterns into the error location polynomial is performed using the Berlekamp algorithm, disclosed in U.S. Pat. No. 4,162,480 and 4,410,989. The error location polynomial is solved by means of the Chien search method, disclosed in U.S. Pat. No. 5,974,582.

The use of RS code in OTN bounds the number of errors that can be corrected to an upper limit. Hence, in order to improve the error correction performance in OTN, there is a need to replace the existing RS code with an alternative code that can ensure an improved error correction. State of the art BCH encoders and decoders are not capable of encoding and decoding information in excess of 10 Gpbs. Furthermore, there is a need to adapt the OTN frame structure to handle the BCH code, i.e., to replace the RS code with the BCH code. Therefore, it would be advantageous to provide an apparatus and method for processing OTN frames while performing error correction by means of a BCH code. It would be further advantageous to provide a BCH decoder capable of decoding information at rates of 10 Gpbs and upwards, and a BCH encoder capable of manipulating the OTN frame to include the BCH code-words.

SUMMARY OF THE INVENTION

The present invention is of an apparatus and method utilizing an efficient forward error correction, targeted for processing optical transport network signals preferably having transmission rates in excess of 10 Gbps. The FEC of the present invention uses an advanced implementation of the Bose-Chaudhuri-Hocquenghem code. The use of the BCH code for the FEC improves the performance over prior art solutions for both error correction and detection.

According to the present invention there is provided in a first embodiment an apparatus for optical transport networks that enables efficient OTN frames processing and improved forward error correction, the apparatus having a line interface for interfacing with an external network and a system interface for interfacing with a client, the apparatus comprising: a line receive unit (LRU) connected to the line interface and receiving through the line interface network OTN frames, the LRU including a BCH decoder for performing the FEC, the LRU capable of processing the network OTN frames into LRU processed network OTN frames; and a system receive unit (SRU) connected to the LRU and the system interface, the SRU capable of optional further processing of the LRU processed network OTN frames, and capable of transmitting the further processed OTN frames through the system interface to the client.

According to additional features in the first embodiment of the apparatus of the present invention, the apparatus further comprises: a system transmit unit (STU) connected to the client through the system interface, the STU capable of processing client OTN frames received through the line interface into STU processed OTN frames; and a line transmit unit (LTU) having an input and an output port and including a BCH encoder, the LTU connected through the input port to the LRU and the STU, and connected through the output port to the line interface, the LTU capable of processing network and client OTN frames received respectively from the LRU and the LTU, into LTU processed OTN frames, and capable of transmitting the LTU processed OTN frames through the line interface to the network.

According to the present invention there is provided in a second embodiment an apparatus for optical transport networks that enables efficient processing of both OTN and SONET/SDH signals as well as improved forward error correction, the apparatus having a line interface for interfacing with an external network and a system interface for interfacing with a client, the apparatus comprising: a LRU connected to the line interface and receiving through the line interface network OTN frames, the LRU including a BCH decoder for performing the FEC, the LRU capable of processing the network OTN frames into LRU processed network OTN frames; a demapper having two ports, connected to the LRU through one of the ports and capable of mapping the LRU processed OTN frames into SONET/SDH signals; and a SONET system receive unit (SONET-SRU) connected to the system interface and to the demapper through the demapper's other port, the SONET-SRU capable of processing SONET/SDH signals received from the LRU, and capable of sending the processed SONET/SDH signals to the client through the system interface.

According to additional features in the first embodiment of the apparatus of the present invention, the apparatus further comprises: a SONET system transmit unit (SONET-STU) connected to the system interface and capable of processing SONET/SDH signals received from the client; a mapper having two ports and connected through one of the ports to the SONET-STU capable of mapping SONET/SDH signals into OTN frames; and a line transmit unit (LTU) having an input and an output port and including a BCH encoder, the LTU connected through the input port to the LRU and to the mapper through the other mapper's port, and connected through the output port to the line interface, the LTU capable of processing network OTN frames received from the LRU and mapped OTN frames received from the mapper into LTU processed OTN frames, and capable of transmitting the LTU processed OTN frames through the line interface to the network.

According to the present invention there is provided a method for enabling effective data flow from an optical transport network to a client, comprising the steps of: receiving at least one scrambled incoming OTN frame from the network, the at least one incoming frame having overheads; performing a forward error correction on the at least one incoming frame, using a BCH code, thereby providing at least one BCH forward corrected frame; and transmitting the at least one BCH forward error corrected frame to the client.

According to the present invention there is provided a method for enabling effective data flow from a client to an optical transport network, comprising the steps of: receiving at least one scrambled incoming OTN frame from the client, the at least one incoming frame having overheads; processing forward error correction data on the at least one incoming frame using a BCH code; and transmitting the at least one frame encoded as a BCH coded frame to the network.

According to the present invention there is provided a method for processing a forward error correction data included in a FEC area in an optical transport network frame, the FEC area supporting a BCH code, the method comprising the steps of: arranging each row of the OTN frame into at least one code-word; processing the at least one redundant code-word for each code word, using a BCH encoder; and integrating the redundant code-word in the FEC area.

BRIEF DESCRIPTION OF THE DRAWINGS

The invention is herein described, by way of example only, with reference to the accompanying drawings, wherein.

DESCRIPTION OF THE PREFERRED EMBODIMENTS

The invention disclosed herein provides an apparatus utilizing an efficient FEC, targeted for the processing of OTN frames in transmission rates of 10 Gbps and above. The FEC scheme used by the provided apparatus is the BCH code. Since the BCH code is not defined in the G.709 standard as the preferred technique for performing FEC, a novel architecture is suggested for performing error detection in high-speed transmission, and for manipulating the OTN frame to handle the BCH code. The inventors have found that using the BCH code for the FEC scheme improved the performance for both error correction and detection.

Figure 3:
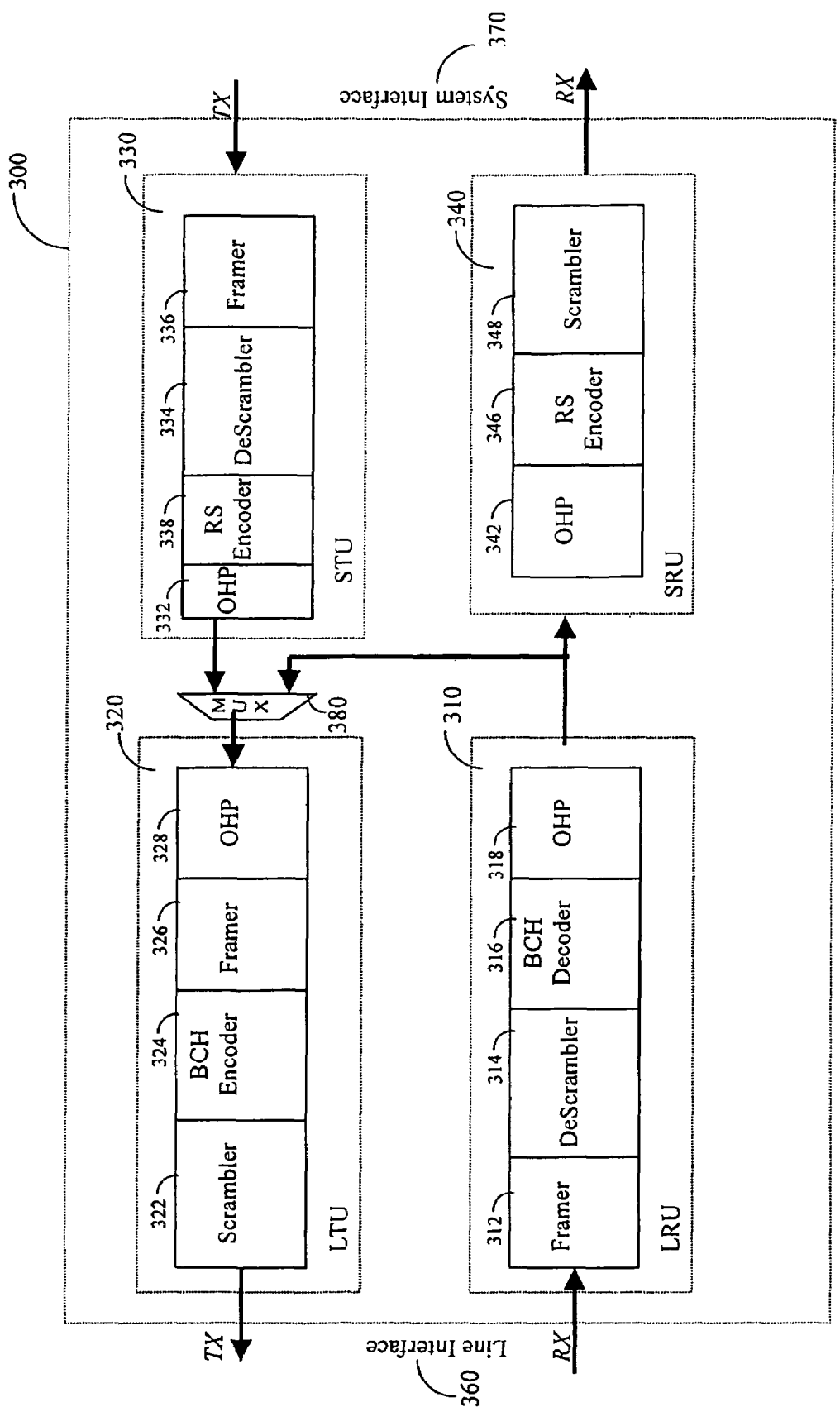
FIG. 3—is an exemplary block diagram of an apparatus designed to process OTN signals in accordance with one embodiment of the invention.

Reference is now made to FIG. 3, which shows an exemplary block diagram of an apparatus 300, designed for processing OTN frames and for performing an efficient FEC. Apparatus 300 preferably includes a line receive unit (LRU) 310, a line transmit unit (LTU) 320, a system transmit unit (STU) 330, a system receive unit (SRU) 340, a line interface 360, a system interface 370, and optionally an internal multiplexer (MUX) 380. Each one of units 310, 320, 330, and 340 has two ports for connection to at least one other unit and to one of the interfaces. In one embodiment, apparatus 300 includes an internal processor (not shown) for OTN optical transport unit (OTU)/optical data unit (ODU)/optical payload unit (OPU) overhead processing. The internal processor may be programmed to handle reserved overheads when such overheads would be defined in the G.709 standard. Line interface 360 interfaces between an external network and apparatus 300. System interface 370 interfaces between a client and apparatus 300. The client may be another apparatus for enabling network-to-network connection, a multiplexer for enabling the transmission of a plurality of OTN signals simultaneously, or a device for performing further processing on a received OTN signal. Network-to-network connection is also possible through line interface 360, as described in more detail below. Both line interface 360 and system interface 370 are preferably standard interfaces SFI-4 and SFI-5 for 10 Gbps and 40 Gbps respectively. Such interfaces are known in the art to be used for connection between a serializer/deserializer device and the optical devices connected to an optical fiber. However, line interface 360 and system interface 370 are not limited to SFI-i interfaces. MUX 380 enables transmission of multiple signals over a single channel, by selecting an active bus to be connected to a designated component in apparatus 300. Specifically, MUX 380 enables OTN signals processed in LRU 310, and OTN signals processed in STU 330 to be transmitted to LTU 320. The signals processed by LRU 310 and transmitted to LTU 320 can be further processed in LTU 320 and transmitted through line interface 360 to a second external network, this being one of the network-to-network connections mentioned above.

In use, apparatus 300 operates in two directions: receive (Rx) and transmit (Tx). In the receive direction, apparatus 300 receives an OTN data stream from line interface 360 through LRU 310. LRU 310 includes a LRU framer 312, a descrambler 314, a BCH decoder 316, and a LRU overhead processor (OHP) 318. First, a frame alignment is performed on the received data by means of framer 312. When using serial frames of data in a transmission system, the receiving equipment must be able to identify the frame boundaries. The ability to identify the beginning of an OTN frame is accomplished through frame alignment. Simultaneously, a detection of the GAIS (generic AIS) signal is performed. The GAIS is a pattern represented by the polynomial $X^{11}+X^9+1$. A detection of the GAIS signal indicates a failure in the transmitting side, and such indication is sent to an external host computer. A detailed explanation of the method for detecting the GAIS signals is provided in U.S. patent application Ser. No. 10/229,062, entitled "Apparatus and Method for Periodic Pattern Detection", by Zeev Masejnik el al., assigned to a common assignee, and which is hereby incorporated by reference for all that it discloses.

After frame alignment, the received frame may optionally be de-scrambled by means of descrambler 314. Next, a FEC is performed by means of BCH decoder 316. As mentioned above, the FEC scheme used in apparatus 300 is BCH. The inventors have found that by using BCH for FEC, the number of the detected and corrected errors is considerably increased. BCH decoder 316 decodes the received data by applying the steps described in greater detail in prior art. BCH decoder 316 is implemented in hardware, and is designed to process data transmitted at rates of 2.5 Gpbs, 10 Gbps, 40 Gbps and higher. Following the FEC, overhead processing is performed by means of LRU-OHP 318. OHP 318 is used to process the information encapsulated in the OTU/ODU/OPU overheads (e.g. 110) in the OTN frame. After processing the received OTN signal by means of LRU 310, an additional processing is performed on it by SRU 340, to allow its transportation through system interface 370. SRU 340 preferably includes a SRU-OHP 342, a Reed Salomon (RS) encoder 346, and a SRU scrambler 348. SRU-OHP 342 inserts the OPU/OTU/ODU overheads, which are processed internally by OHP 342. The overheads insertion is required in case there is a need for transmitting new information (i.e. the data added to the received frame as a result of the frame processing) through system interface 370. RS encoder 346 creates the RS code-words to be placed in the FEC area (e.g. 130 in FIG. 1) and to replace the existing BCH code-words. The processing of the RS code-words is performed in accordance with the G.709 standard. The RS encoding is optional and is performed if, and only if, the client connected to system interface 370 includes a RS decoder. Otherwise, the information is transmitted through the system interface as is Scrambler 348 scrambles the outgoing data stream. In case there is a need to generate a GAIS pattern, the outgoing data stream is replaced by the GAIS pattern. The completed OTN frame is then transmitted through system interface 370.

In the transmit direction, data flows from system interface 370 to line interface 360. STU 330 accepts data streams from system interface 370 and performs frame alignment on the received data by means of a framer 336. Simultaneously, a detection of the GAIS signal is performed. After frame alignment, the received frame may optionally be de-scrambled by means of descrambler 334. If the incoming frame includes RS code-words, a FEC is performed by means of RS decoder 338. Next, the data is passed to a STU-OHP 332 for overhead processing. OHP 332 processes the information encapsulated in the OTN overhead area (e.g., FEC 130 in FIG. 1). Then the data is passed to LTU 320 for allowing the transmission of the received frame through line interface 360. LTU 320 includes a LTU-OHP 328, a LTU framer 326, a BCH encoder 324, and a LTU scrambler 322. LTU-OHP 328 inserts the OPU/OTU/ODU overheads, which may optionally be processed by OHP 328. The overheads insertion is required for transmitting new information through line interface 360. Framer 326 generates the fault signals (e.g., GAIS signals), if required, and creates the OTN frame according to the OTN standard. BCH encoder 324 produces the redundancy bits placed in the FEC area (e.g., FEC 130). As mentioned above, using a BCH code for FEC in OTN is not straightforward, since the G.709 standard defines only the use of RS code for performing FEC. For that reason, there is a need to manipulate the OTN frame to include the BCH code.

In order to process the FEC data, at least one BCH code-word is passed to encoder 324, where the length of the shortest code-word is at least 15,232 bits. The length of a RS code-word defined in the G.709 is 239 bytes (1,912 bits). By using long BCH code-words, the number of errors that can be detected is increased. The BCH code-words are inserted in FEC area 130, while making sure their lengths do not exceed the allowable number of redundancy bits in the FEC area. A preferred embodiment of the method used for processing FEC area 130 using the BCH code-words according to the present invention is described in greater detail below. Before transmitting the OTN frame through line interface 360 the data is optionally scrambled by means of LTU scrambler 322. Data scrambling is typically performed to avoid the existence of long streams of "zeroes" or "ones", especially, when transmitting data via fiber optics lines. Long streams of "zeroes" or "ones" significantly complicate the detection ability on the receiving side.

In another embodiment of a method using apparatus 300, OTN frames may be received through line interface 360 processed by LRU 310 mainly for error correction. The corrected frames are then passed to LTU 320 for BCH encoding, and transmitted back to the network through line interface 360.

The OTN signals processed by apparatus 300 include, but are not limited to, OTN signals transmitted in line rate of 2.5 Gbps (OTU1), 10 Gbps (OTU2) and 40 Gpbs.

Figure 1:
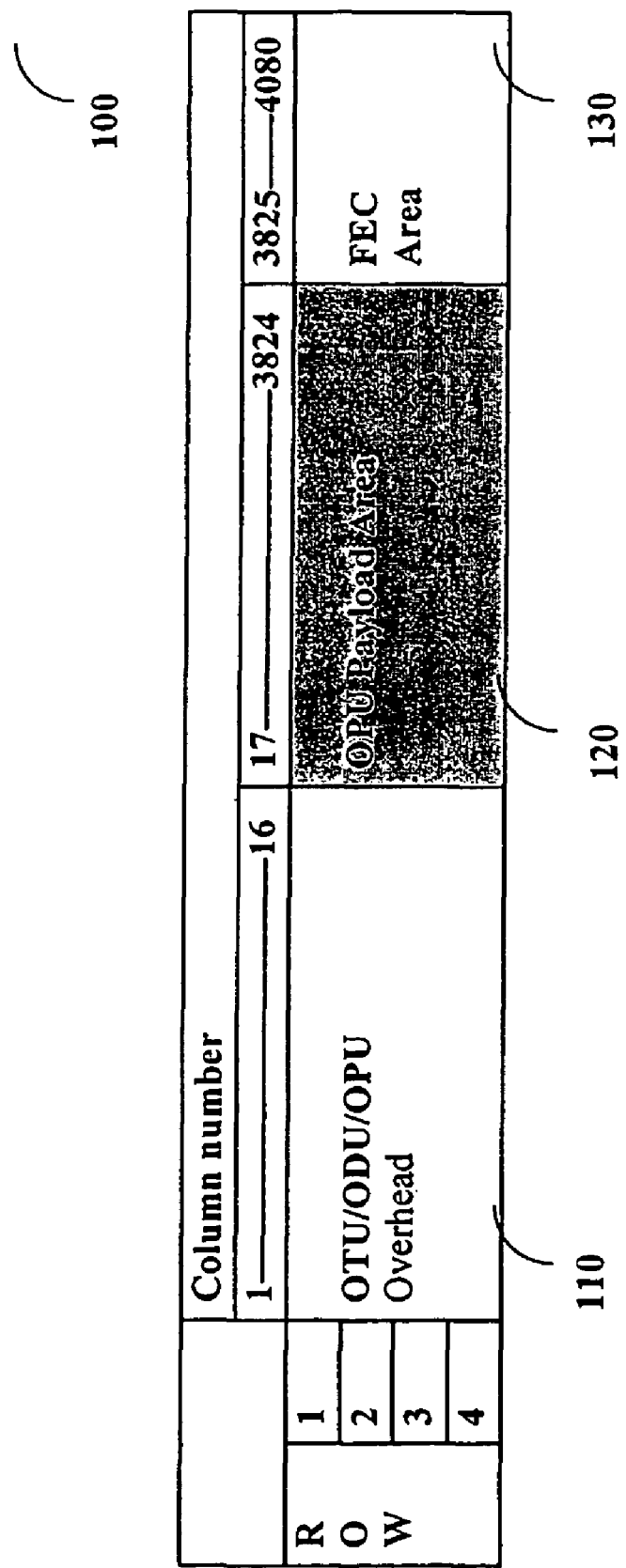
FIG. 1—is an illustration of an OTN frame structure (prior art)
Figure 2:
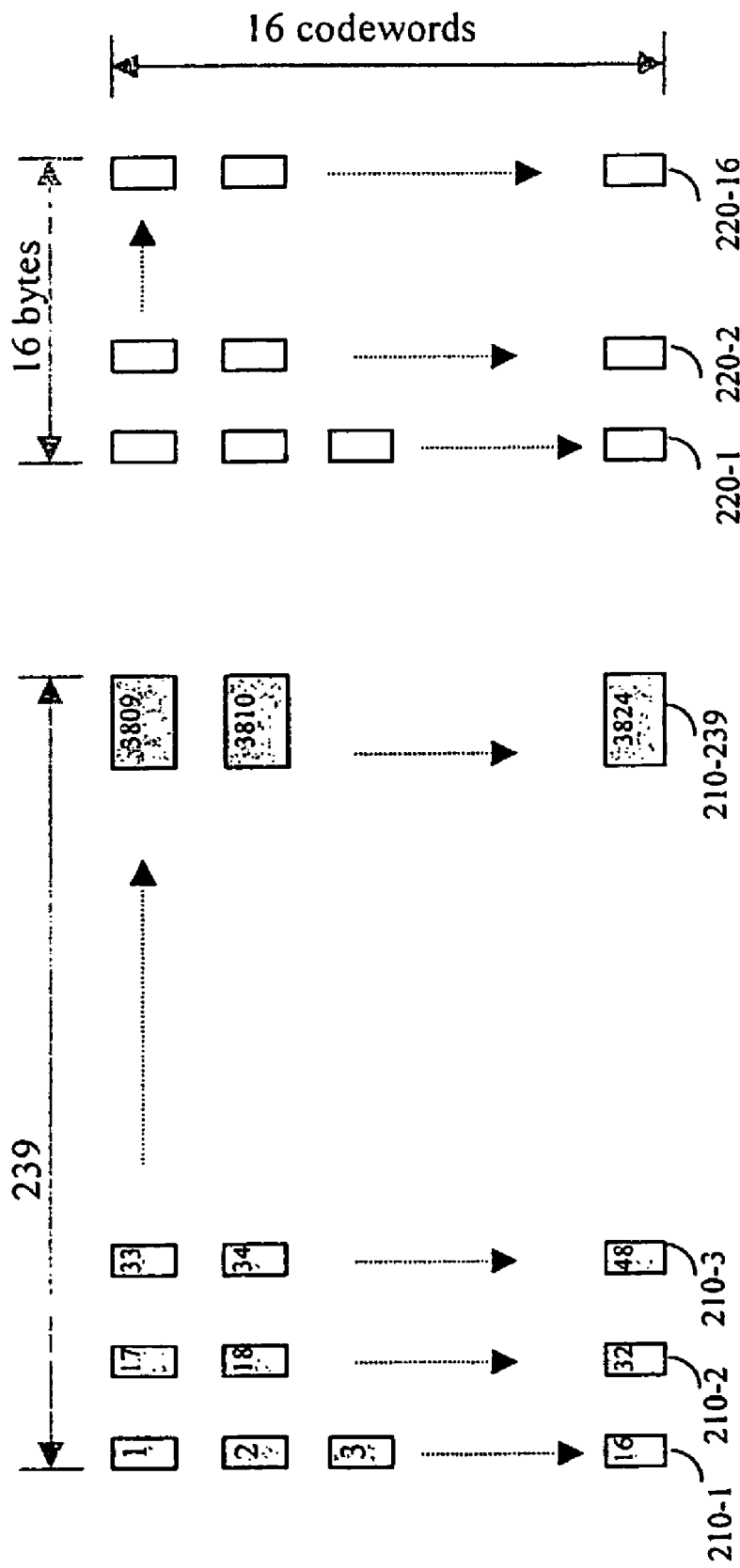
FIG. 2—is a schematic diagram illustrating the creation of the FEC area (prior art)
Figure 4:
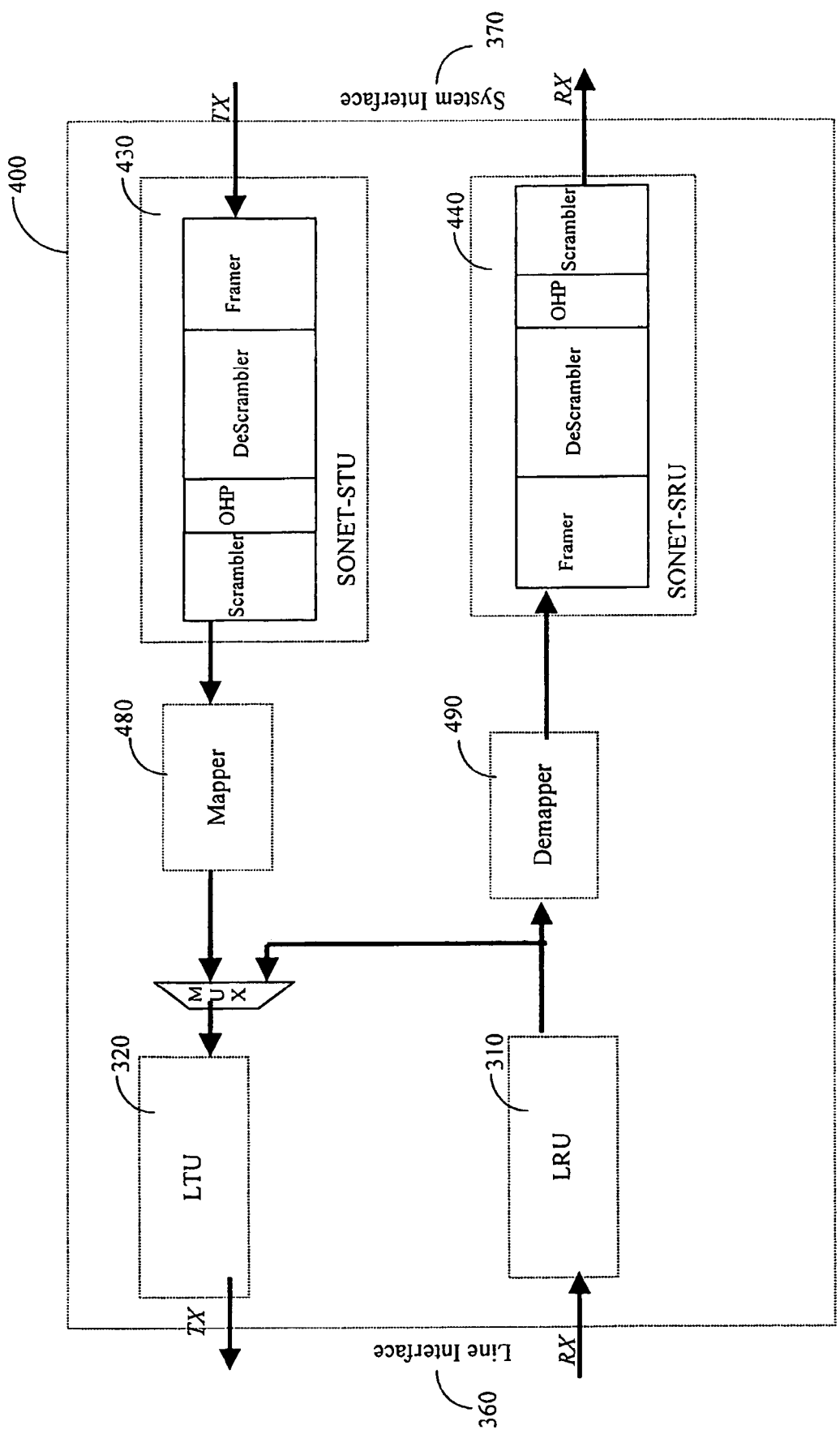
FIG. 4—is an exemplary block diagram of an apparatus designed to process OTN and SONET/SDH signals in accordance with another embodiment of the invention.

Reference is now made to FIG. 4, which shows an exemplary block diagram of an apparatus 400 designed for processing OTN and SONET/SDH signals, in accordance with another embodiment of the apparatus of the present invention. Apparatus 400 includes most of the components of apparatus 300 and four additional components used for the adaptation of SONET/SDH signals into OTN frames, and the adaptation of an OTN frames into SONET/SDH signals. The four additional components are: a SONET-system transmit unit (SONET-STU) 430, a SONET-system receive unit (SONET-SRU) 440, a mapper 480 and a demapper 490. Apparatus 400 operates in two directions: transmit and receive. In the transmit direction, SONET-STU 430 accepts SONET/SDH signals from system interface 370 and performs frame alignment, as well as overhead processing of the received signals. Then, the SONET/SDH signals are passed to mapper 480. Mapper 480 primarily maps the incoming SONET/SDH signals into OPU payload area 120 (FIG. 1). Next, the OTN signals are processed using LTU 320 as described in greater detail in the description of FIG. 3 above. It should be noted that the OTN signal transmitted through line interface 360 includes now BCH code-words for FEC, therefore providing an advantage over the prior art systems.

In the receive direction, LRU 310 accepts the OTN signals from line interface 360 and processes them as described in greater detail above. As with apparatus 300, the FEC scheme used for error correction is BCH, therefore providing an advantage over the prior art systems. The OTN signals are then passed to demapper 490. Demapper 490 primarily converts the incoming OTN payload area 120 into SONET/SDH signals. The SONET/SDH signals are then passed to SONET-SRU 440 for further processing. SONET-SRU 440 mainly performs frame alignment and overhead processing before transmitting the SONET/SDH signal through system interface 370.

Apparatus 400 handles SONET/SDH signals with line rates of 10 Gbps (e.g. OC-192/STM-64 signals) or 40 Gbps (e.g., OC-768/STM-256 signals). However, a person skilled in the art could easily modify apparatus 400 to handle other types of signals defined in the SONET/SDH standards, for example 2.5 Gbps signals (e.g., OC-48/STM-16) or future 160 Gbps signals.

In order to use the BCH code in an OTN frame, there is a need to process the overhead area 110 and the payload area 120 of FIG. 1 through a BCH encoder, while not exceeding the allowable number of redundancy bytes. The number of redundancy bytes is as defined in the G.709 standard, however, in some cases the number of redundancy bytes exceeds the allowable bytes (e.g. more than 7% as defined in G.709 standard) to achieve improved errors detection and correction. Further, there is a need to process the overhead area and the payload area at a clock rate determined by the OTN transmission rate. For example, if the OTN transmission rate is 40 Gbps, then the clock rate is 128 bits per cycle. To facilitate this process, first, each row of OTN frame 100 (not including FEC area 130) is arranged into at least one code-word, where the length of the shortest code-word is at least 15232 bits. Next, each cycle of P consecutives bits of the code-words are sent to the BCH encoder, which outputs the redundancy information after the entire data of the code-word(s) have been received.

Figure 5:
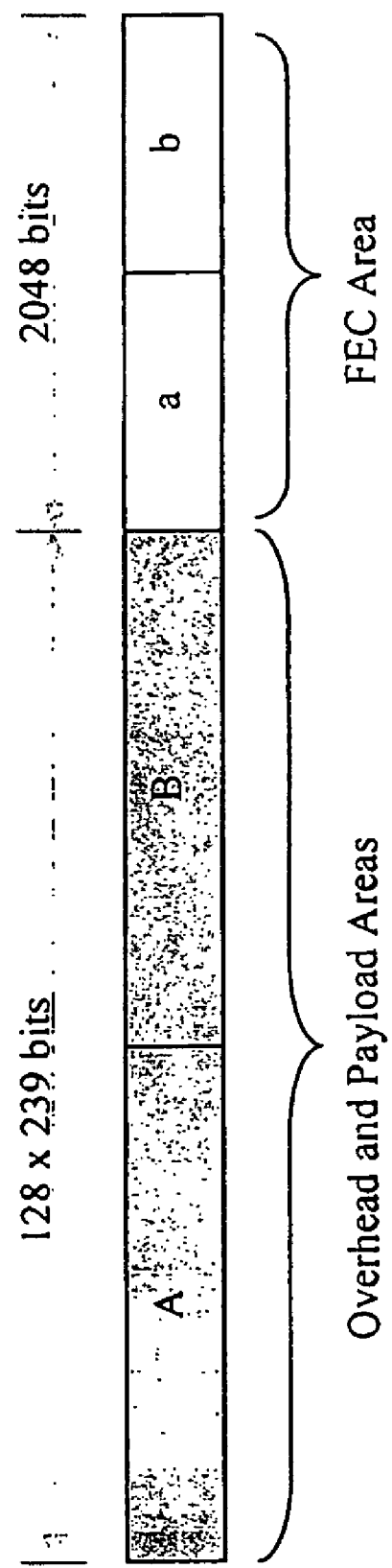
FIG. 5—is an illustration of a method for processing the BCH code in accordance with an embodiment of the invention.

Reference is now made to FIG. 5 where an example of using two BCH code-words for the creation of FEC area 130 in accordance with another embodiment of the invention, is shown. FIG. 5 shows two code-words "A" and "B", where, the length of code-words "A" and "B" are P*N bits and P*M respectively, wherein "P" is the clock rate, and N and M are the number of cycles. On each cycle, P bits are passed to BCH encoder 324 (FIG. 3). After N cycles, the redundancy bits ("a") of code-word "A" are outputted, and after another M cycles, the redundancy bits ("b") of code-word "B" are outputted. The parameters P, N, and M are determined according to the OTN transmission rate. As a non-limiting example, for a 40 Gbps transmission rate (i.e., OTU-3) "P" equals 128, "N" equals 120, and "M" equals 119. Hence, the length of code-words "A" and "B" is 128*120 (i.e., 15,360) bits and 128*119 (i.e., 15,232) bits respectively, both of which are longer than the RS code-words in the RS (255,239) code. The process described above is repeated three additional times to complete the entire OTN frame. It should be noted that the length of a single code-word is not limited to the size of a single row of OTN frame 100.

In yet another embodiment of the method of the present invention, the code-words of the entire OTN frame are interleaved prior to the encoding. The interleaving allows improved performance for detecting and correcting burst errors. By interleaving the code-words, burst errors are spread over different code-words, thus increasing the error detection and correction capability.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. An apparatus for optical transport networks (OTNs) that enables efficient OTN frames processing and improved forward error correction (FEC), the apparatus having a line interface for interfacing with an external network and a system interface for interfacing with a client, the apparatus comprising:

a line receive unit (LRU) connected to the line interface and receiving through the line interface network OTN frames, said LRU including a Bose-Chaudhuri-Hocquenghem (BCH) decoder for performing FEC on said OTN frames using solely a BCH code, said LRU processes forward error corrected OTN frames into LRU processed network OTN frames; and a system receive unit (SRU) connected to said LRU and the system interface, said SRU processes said LRU processed network OTN frames to generate SRU processed OTN frames; and further transmits said SRU processed OTN frames through the system interface to the client; and a line transmit unit (LTU) including a BCH encoder, said LTU connected through a multiplexer to said LRU and said STU, said LTU processes network and client OTN frames received respectively from said LRU and said STU into LTU BCH coded OTN frames that are being output to the network through the line interface, wherein said BCH encoder produces redundancy bits by processing at least one BCH code-word, wherein said redundancy bits are placed in a FEC area of an OTN frame.

2. The apparatus of claim 1, further comprising:

a system transmit unit (STU) connected to the client through the system interface, said STU processes client OTN frames received through said line interface into STU processed OTN frames.

3. The apparatus of claim 1, where said OTN frames are transmitted at a line rate of at least 40 Gbps.

4. The apparatus of claim 1, wherein said network OTN frames are scrambled.

5. The apparatus of claim 1, wherein said LRU further includes:

a framer for performing at least one frame alignment on at least one of said network OTN frames, a first overhead processor for processing overheads of said network OTN frames, and a descrambler for descrambling said network OTN frames.

6. The apparatus of claim 2, wherein said connection of said LTU through said input port to said LRU and said STU includes a connection through a multiplexer.

7. The apparatus of claim 2, wherein said LTU further includes:

a second overhead processor for processing overheads of at least one of: said client OTN frames, and said LRU processed network OTN frames;

a framer for performing at least one frame alignment on at least one of said client OTN frames, and said LRU processed network frames; and a scrambler for scrambling said LTU processed OTN frames.

8. The apparatus of claim 1, wherein the line and system interfaces include each an interface selected from the group consisting of a SFI-5 interface and a SFI-4 interface.

* * * * *